United States Patent
Kawakami et al.

(10) Patent No.: US 9,354,836 B2
(45) Date of Patent: May 31, 2016

(54) IMAGE FORMING SYSTEM, PORTABLE TERMINAL, AND IMAGE FORMATION METHOD THAT SHOWS PREVIEW OF RECEIVED IMAGE

(71) Applicant: KYOCERA Document Solutions Inc., Osaka (JP)

(72) Inventors: Satoshi Kawakami, Osaka (JP); Akira Yuki, Osaka (JP); Takahiro Minami, Osaka (JP); Daisuke Yoshida, Osaka (JP); Masaya Okuda, Osaka (JP); Yoshitaka Matsuki, Osaka (JP); Yuri Moritani, Osaka (JP); Tsuyoshi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/669,828

(22) Filed: Mar. 26, 2015

(65) Prior Publication Data

US 2015/0277834 A1    Oct. 1, 2015

(30) Foreign Application Priority Data

Mar. 26, 2014 (JP) .................................. 2014-064392
Oct. 31, 2014 (JP) .................................. 2014-223637

(51) Int. Cl.
*G06F 3/12* (2006.01)
*G06K 15/02* (2006.01)

(52) U.S. Cl.
CPC ............. *G06F 3/1292* (2013.01); *G06F 3/1237* (2013.01); *G06K 15/025* (2013.01)

(58) Field of Classification Search
None
See application file for complete search history.

(56) References Cited

U.S. PATENT DOCUMENTS

| | | | |
|---|---|---|---|
| 2008/0166966 A1* | 7/2008 | Hamasaki | H04B 1/3805 455/41.2 |
| 2011/0255111 A1* | 10/2011 | Oba | G06F 3/1247 358/1.13 |
| 2014/0218760 A1* | 8/2014 | Murata | G06F 3/1204 358/1.15 |
| 2014/0355057 A1* | 12/2014 | Jang | G06K 7/10297 358/1.15 |

FOREIGN PATENT DOCUMENTS

JP     2004-192162 A     7/2004

* cited by examiner

*Primary Examiner* — Thomas D Lee
(74) *Attorney, Agent, or Firm* — Hawaii Patent Services; Nathaniel K. Fedde; Kenton N. Fedde

(57) ABSTRACT

Provided is an image forming system that has a portable terminal and an image forming apparatus. The portable terminal includes a preview image data request notice transmitting circuit, a preview image data receiving circuit, a preview image display circuit, a preview image confirmation input circuit, and a preview image data deletion notice transmitting circuit. The image forming apparatus includes a preview image data request notice receiving circuit, a preview image data generating circuit, a preview image data transmission circuit, a preview image data deletion notice receiving circuit, and an image forming apparatus preview image data deletion circuit. The portable terminal transmits a preview image data deletion notice to an image forming apparatus, when it inputs that the preview image is confirmed. Then, the image forming apparatus deletes preview image data.

13 Claims, 12 Drawing Sheets

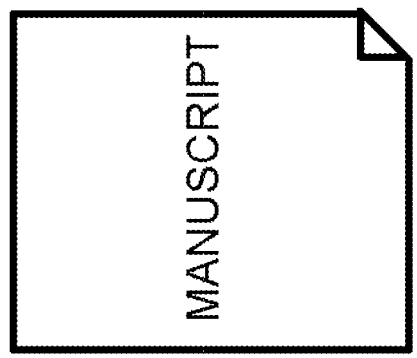
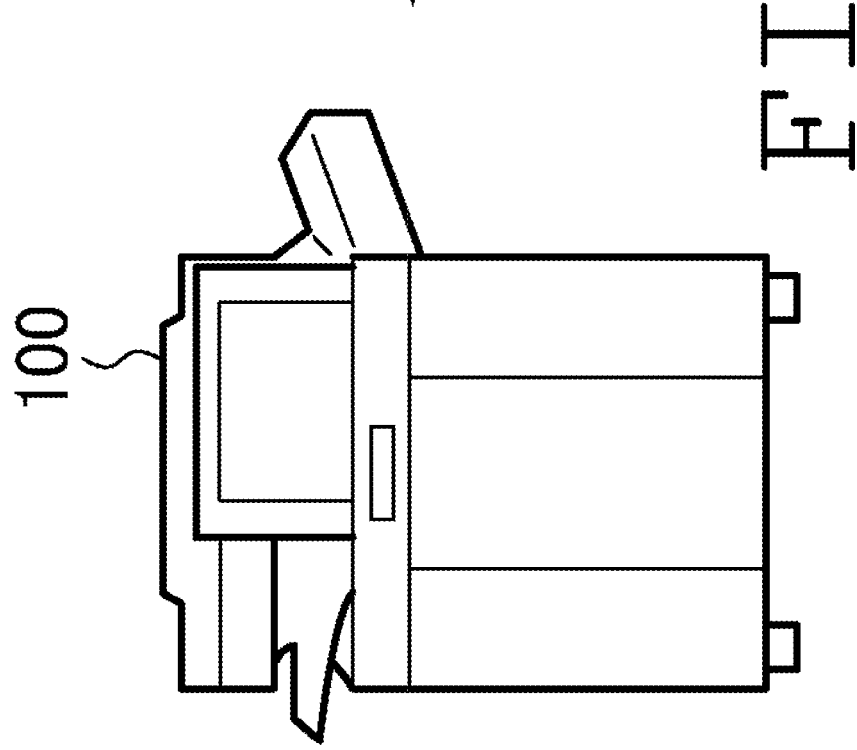
FIG. 3A

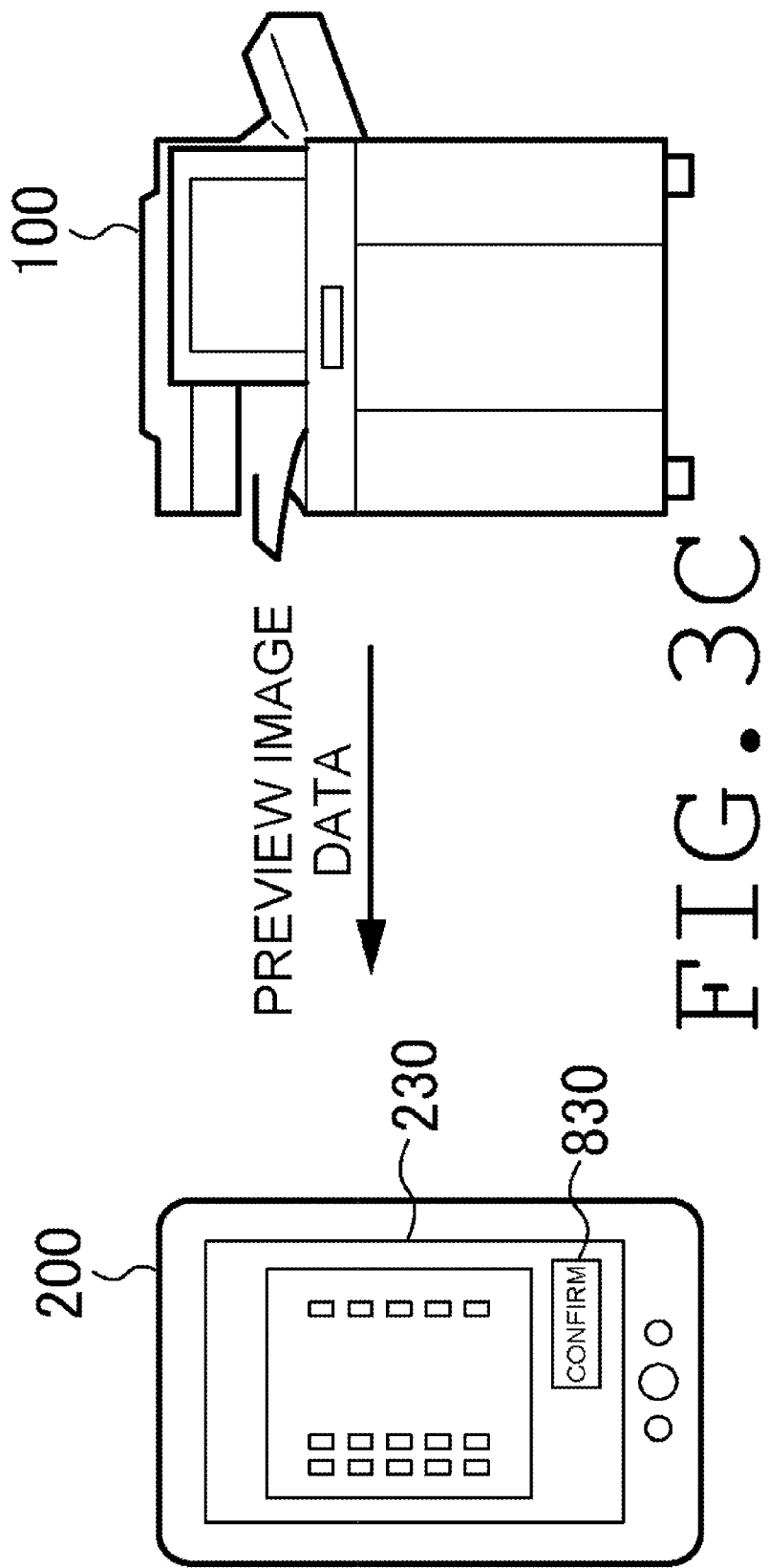

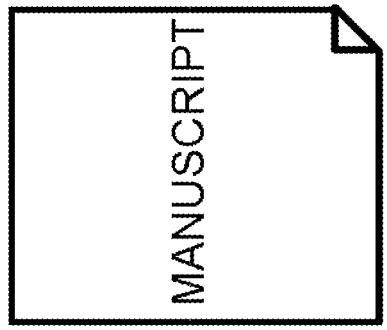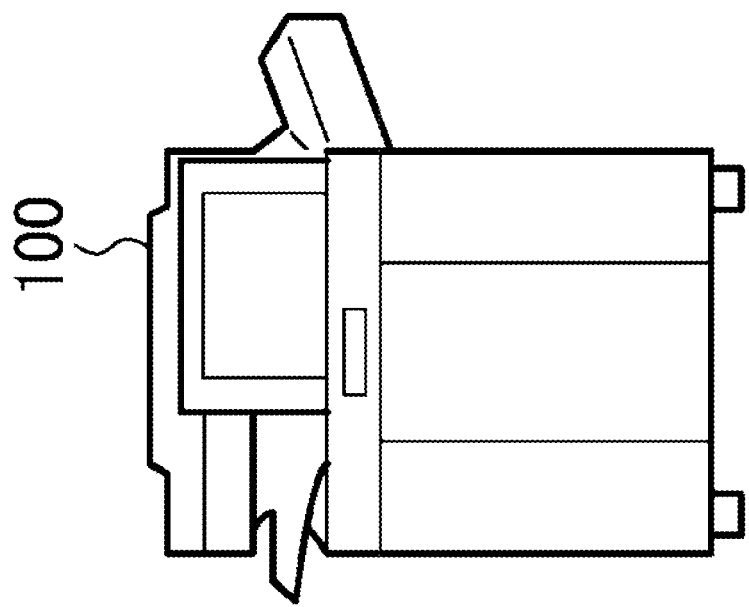
FIG. 5A

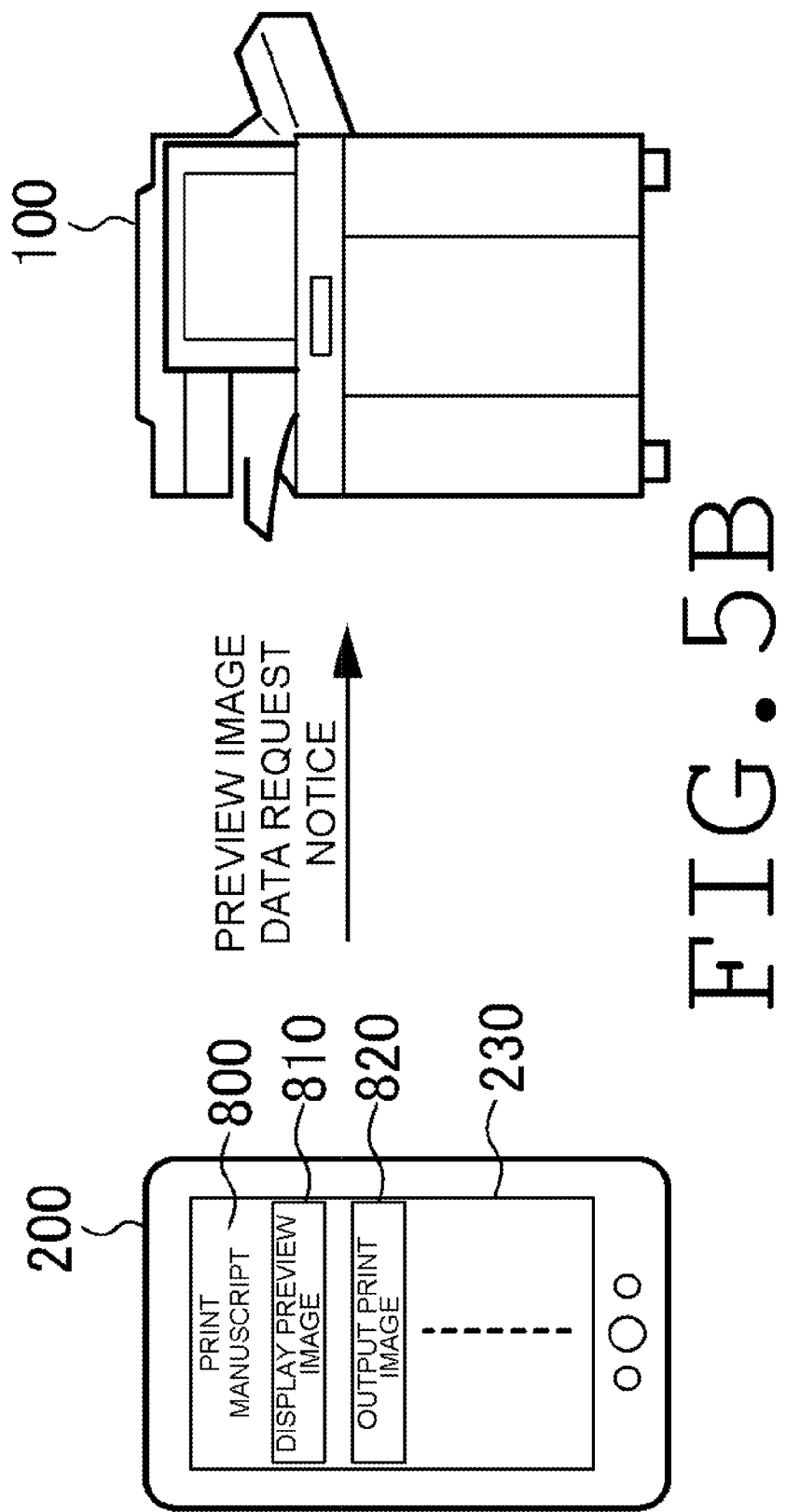

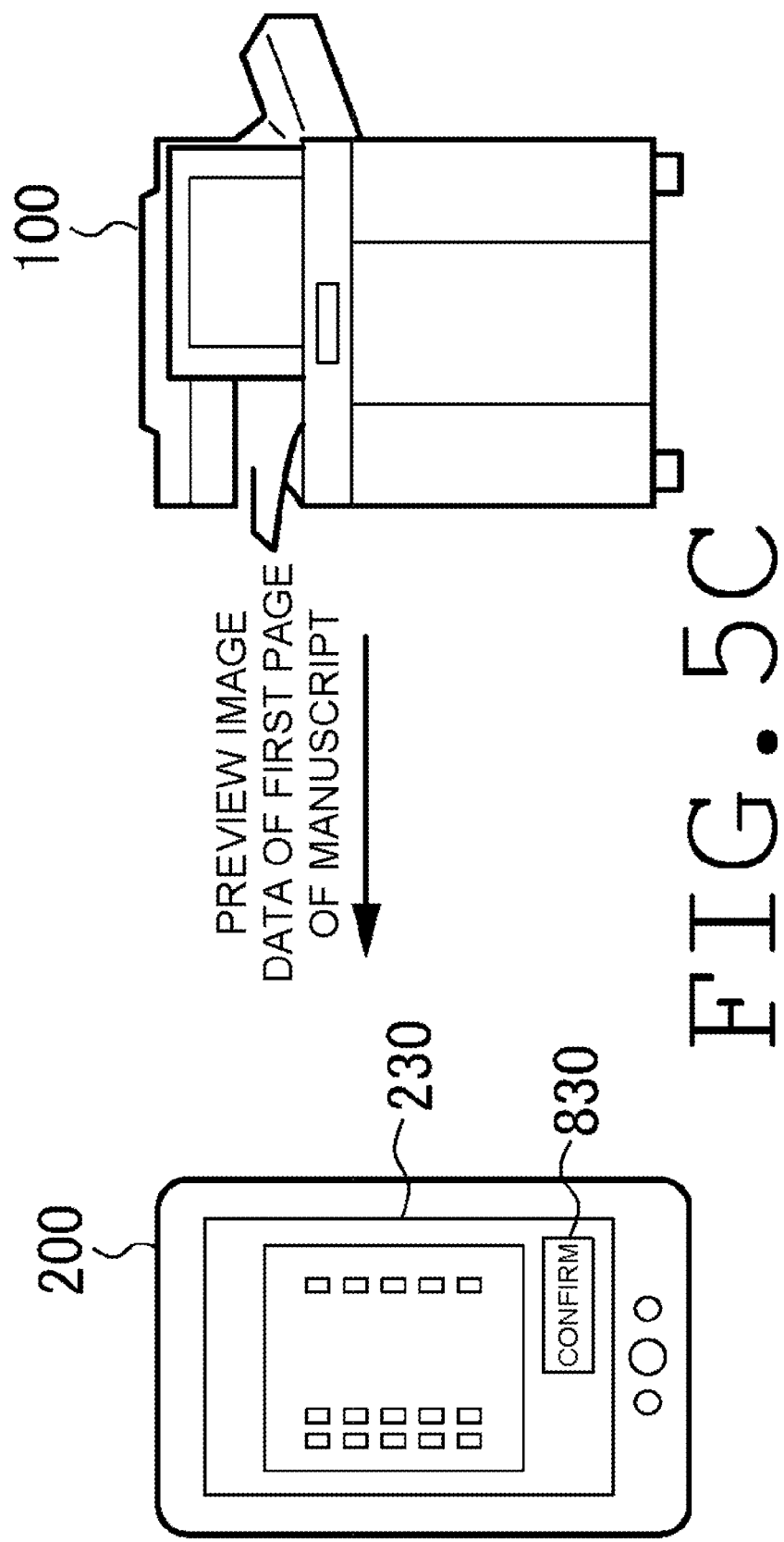

IMAGE FORMING SYSTEM, PORTABLE TERMINAL, AND IMAGE FORMATION METHOD THAT SHOWS PREVIEW OF RECEIVED IMAGE

INCORPORATION BY REFERENCE

This application is based on and claims the benefit of priority from Japanese Patent Application No. 2014-064392 filed on Mar. 26, 2014 and Japanese Patent Application No. 2014-223637 filed on Oct. 31, 2014, and the contents of which are hereby incorporated by reference.

BACKGROUND

The present disclosure is related to the image forming system, portable terminal, and image formation method that shows print image of image received from the image forming apparatus (henceforth a "preview") on the portable terminal.

An image forming apparatus is a printer, a multifunction printer, multifunctional peripheral equipment, or an MFP (Multifunction Peripheral). The image forming apparatus generates image data of a preview from image data of read manuscript (henceforth "preview image data.") The image forming apparatus can transmit the generated preview image data to a portable terminal, such as a mobile phone, a smart phone, or a tablet terminal by wireless communications. Also, the portable terminal receives the preview image data from the image forming apparatus, and shows a preview image on the operation panel of the portable terminal. Thereby, the user can confirm the preview image at hand. For example, in a typical printing system, a printer, and a printing method, a print preview request is transmitted from an external apparatus as like a portable terminal by remote access to the printer. In this case, an external apparatus is a personal computer, an information terminal, a facsimile, or the like, which are connected with the image forming apparatus as like a printer via the network. Then, a printer generates a print preview image according to the display capabilities of the external apparatus and can show the appropriate print preview image on the external apparatus. Also, after the printer supplies the print preview image to the external apparatus, a definite period of time may pass in the state having no printing execution instruction from the external apparatus. In this case, the image data and the printing preview data related to the print preview request are deleted.

SUMMARY

An image forming system according to an embodiment of the present disclosure is an image forming system that has a portable terminal and an image forming apparatus. The portable terminal includes a preview image data request notice transmitting circuit, a preview image data receiving circuit, a preview image display circuit, a preview image confirmation input circuit, and a preview image data deletion notice transmitting circuit. The preview image data request notice transmitting circuit transmits a preview image data request notice to the image forming apparatus. The preview image data receiving circuit receives preview image data from the image forming apparatus. The preview image display circuit shows an image of the preview image data. The preview image confirmation input circuit inputs to be confirmed the preview image. The preview image data deletion notice transmitting circuit transmits a preview image data deletion notice to the image forming apparatus. The image forming apparatus includes a preview image data request notice receiving circuit, a preview image data generating circuit, a preview image data transmission circuit, a preview image data deletion notice receiving circuit, and an image forming apparatus preview image data deletion circuit. The preview image data request notice receiving circuit receives the preview image data request notice from the portable terminal. The preview image data generating circuit generates the preview image data from image data. The preview image data transmission circuit transmits the preview image data to the portable terminal. The preview image data deletion notice receiving circuit receives the preview image data deletion notice from the portable terminal. The image forming apparatus preview image data deletion circuit deletes the preview image data memorized in the image forming apparatus. The portable terminal, when inputting to be confirmed the preview image, transmits the preview image data deletion notice to the image forming apparatus. The image forming apparatus deletes the preview image data. Also, a portable terminal according to an embodiment of the present disclosure includes a preview image data request notice transmitting circuit, a preview image data receiving circuit, a preview image display circuit, a preview image confirmation input circuit, and a preview image data deletion notice transmitting circuit. The preview image data request notice transmitting circuit transmits a preview image data request notice to an image forming apparatus. The preview image data receiving circuit receives preview image data from the image forming apparatus. The preview image display circuit shows the image of the preview image data. The preview image confirmation input circuit inputs to be confirmed the preview image. The preview image data deletion notice transmitting circuit transmits a preview image data deletion notice to the image forming apparatus. When inputting to be confirmed the preview image, the preview image data deletion notice is transmitted to the image forming apparatus. Also, an image formation method according to an embodiment of the present disclosure is an image formation method performed by an image forming system having a portable terminal and an image forming apparatus. In the portable terminal, a preview image data request notice is transmitted to the image forming apparatus, preview image data is received from the image forming apparatus, the image of the preview image data is shown, it inputs to be confirmed the preview image, and a preview image data deletion notice is transmitted to the image forming apparatus. Also, in the image forming apparatus, the preview image data request notice is received from the portable terminal, the preview image data is generated from image data, the preview image data is transmitted to the portable terminal, the preview image data deletion notice is received from the portable terminal, and the preview image data memorized in the image forming apparatus is deleted. Also, in the portable terminal, when inputting to be confirmed the preview image, the preview image data deletion notice is transmitted to the image forming apparatus. The image forming apparatus deletes the preview image data.

BRIEF DESCRIPTION OF THE DRAWINGS

FIG. 3A illustrates an operating procedure that confirms a preview image of a manuscript related to embodiment 1 in the present disclosure;

FIG. 3C illustrates the operating procedure that confirms the preview image of the manuscript related to embodiment 1 in the present disclosure;

FIG. 5A illustrates an operating procedure that confirms the preview image of the manuscript related to embodiment 2 in the present disclosure;

FIG. 5B illustrates the operating procedure that confirms the preview image of the manuscript related to embodiment 2 in the present disclosure;

FIG. 5C illustrates the operating procedure that confirms the preview image of the manuscript related to embodiment 2 in the present disclosure;

DETAILED DESCRIPTION

Hereinafter, a first embodiment for carrying out the present disclosure (henceforth "embodiment 1") is described with reference to figures. According to embodiment 1, a user operates a portable terminal. Then, by using a manuscript set to a manuscript stand of the image forming apparatus, image data of an image that can be printed (henceforth "print image data") and preview image data are generated. These data is memorized in the image forming apparatus. Also, the image forming apparatus transmits the preview image data to the portable terminal. Then, the portable terminal shows the preview image data on an operation panel after memorizing. A user confirms the shown preview image. Then, both the preview image data memorized in the portable terminal and the image forming apparatus are deleted.

Figure 1:
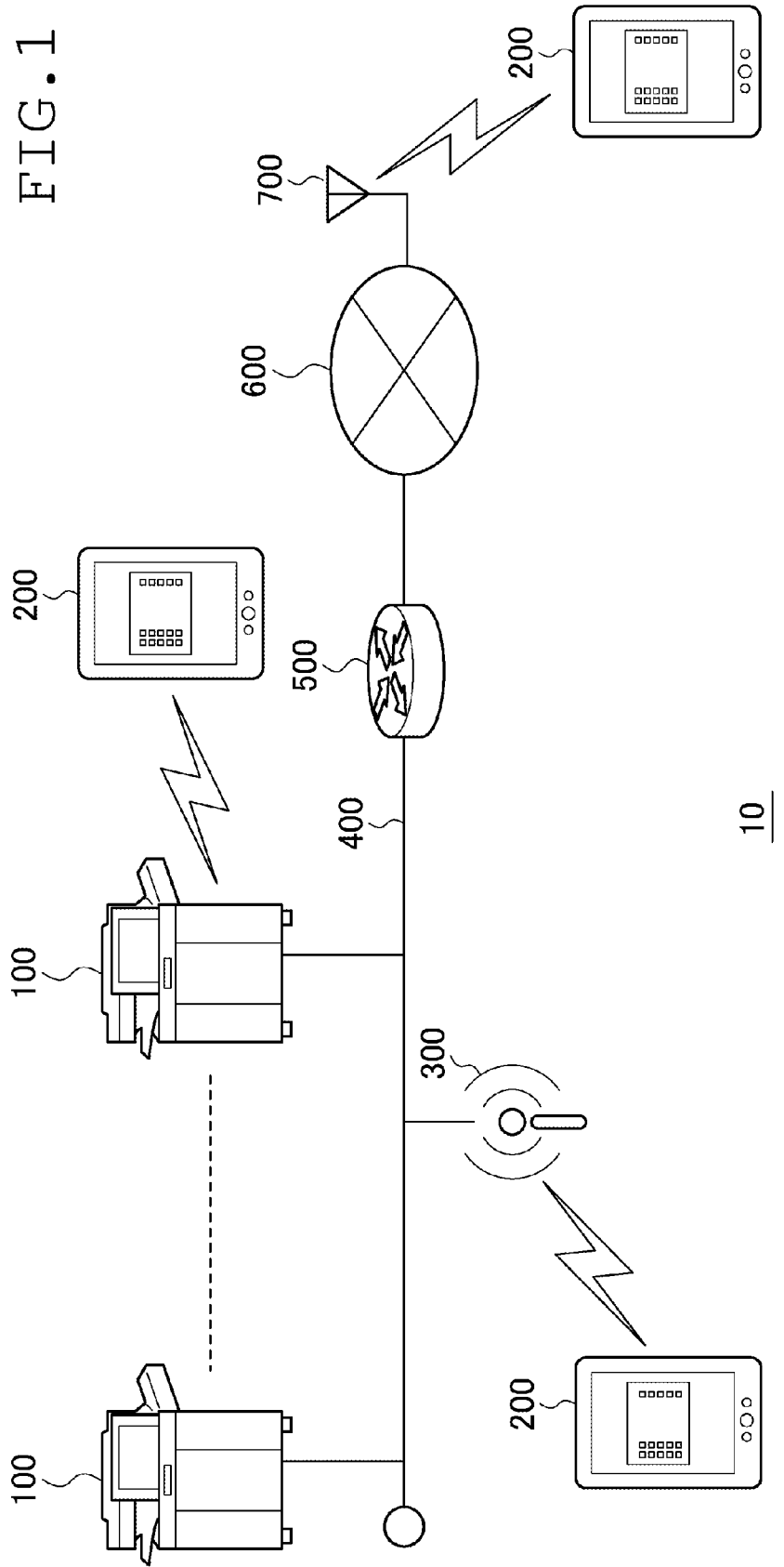
FIG. 1 illustrates a configuration of an image forming system related to embodiment 1 in the present disclosure.

First, the system configuration of image forming system 10 in the present embodiment 1 is explained with referring FIG. 1. As shown in FIG. 1, image forming system 10 includes a plurality of image forming apparatuses 100, a plurality of portable terminals 200, access point 300, network 400, router 500, Internet 600, and access point 700. Image forming apparatus 100 and access point 300 are connected with network 400. Network 400 is connected to Internet 600 via router 500.

Image forming apparatus 100 can perform transmission and reception of data with portable terminal 200 by using short-distance-radio communication, access point 300, or Internet 600.

Portable terminal 200 can perform transmission and reception of data with image forming apparatus 100 by using short-distance-radio communication, access point 300 of network 400, or access point 700 of Internet 600.

Access point 300 is connected to network 400. Access point 300 connects portable terminal 200, which has a connection request to access point 300 by wireless communications, to network 400.

Networks 400 is a network, such as intranet. In network 400, access point 300 is connected with a plurality of image forming apparatuses 100.

Router 500 is connected to network 400. Router 500 connects network 400 to Internet 600.

Internet 600 is an IP network, such as the Internet and intranet. A plurality of portable terminals 200 connect to Internet 600 via access point 700.

Figure 2:
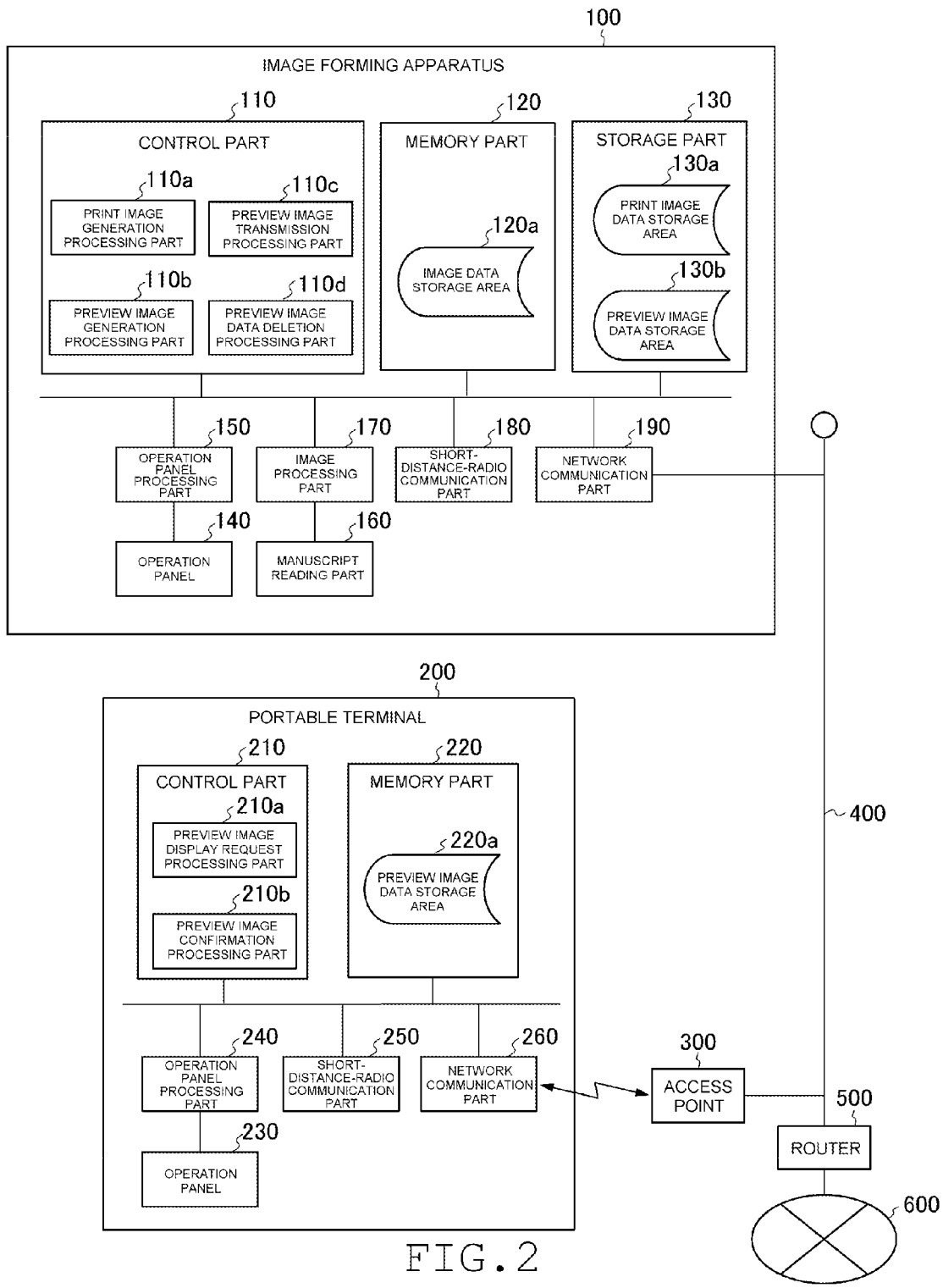
FIG. 2 illustrates functional configuration of an image forming apparatus and a portable terminal of the image forming system as shown in FIG. 1.

Then, a functional configuration of image forming apparatus 100 and portable terminal 200 in image forming system 10 are explained with referring FIG. 2. Image forming apparatus 100 and portable terminal 200 shown in FIG. 2 is a functional configuration of one image forming apparatus 100 and one portable terminal 200 in image forming system 10 as shown in FIG. 1. One image forming apparatus 100 is connected to network 400. Also, one portable terminal 200 is connected to network 400 by access point 300. Also, about other image forming apparatuses 100 and portable terminal 200 as shown in FIG. 1 have similar functional configurations.

First, the functional configuration of image forming apparatus 100 is explained. Image forming apparatus 100 shown in FIG. 2 includes control part 110, memory part 120, storage part 130, operation panel 140, operation panel processing part 150, manuscript reading part 160, image processing part 170, short-distance-radio communication part 180, and network communication part 190. Each part of these has a configuration connected to bus or the like. Control part 110 includes print image generation processing part 110a, preview image generation processing part 110b, preview image transmission processing part 110c, and preview image data deletion processing part 110d. Memory part 120 includes image data storage area 120a. Storage part 130 includes print image data storage area 130a and preview image data storage area 130b.

Control part 110 is a circuit that has controller, such as a non-transitory recording medium and CPU (Central Processing Unit.) Also, control part 110 performs overall control of image forming apparatus 100. Print image generation processing part 110a is a circuit that extracts image data from image data storage area 120a. Also, print image generation processing part 110a generates print image data from the extracted image data. Also, print image generation processing part 110a is memorized in print image data storage area 130a. Preview image generation processing part 110b is a circuit that extracts image data from image data storage area 120a. Also, preview image generation processing part 110b generates preview image data from the extracted image data. Also, preview image generation processing part 110b is memorized in preview image data storage area 130b. Preview image transmission processing part 110c is a circuit that extracts preview image data from preview image data storage area 130b and transmits it to portable terminal 200. Preview image data deletion processing part 110d, when a preview image data deletion notice is received from portable terminal 200, deletes preview image data in preview image data storage area 130b.

Memory part 120 is a non-transitory recording medium such as a solid state drive and memorizes a program and data for a process that control part 110 performs. Image data storage area 120a memorizes image data read in manuscript reading part 160 and image data received from other image forming apparatus 100 and portable terminals 200 via network communication part 190. In addition, image data memorized in image data storage area 120a is deleted when the print image data corresponding to the image data is printed.

Storage part 130 is a hard disk drive that memorizes data and a program. Print image data storage area 130a memorizes the print image data that print image generation processing part 110a generates from the image data. Preview image data storage area 130b memorizes the preview image data that preview image generation processing part 110b generates from the image data.

Operation panel 140 is a liquid crystal panel the performs display of an image of an operation screen, print image data, or preview image data and receives operation by a user.

Operation panel processing part 150 is a circuit that performs a process to show an operation item for function that image forming apparatus 100 has on operation panel 140. Also, operation panel processing part 150 performs a process that shows the image of the print image data or the preview image data on operation panel 140. Also, operation panel processing part 150 performs a process that inputs a user operation from operation panel 140.

Manuscript reading part 160 is a document scanner that reads a manuscript set to a manuscript stand of image forming apparatus 100. This is based on a reading operation from operation panel 140 by a user or a preview image data request notice from portable terminal 200. Manuscript reading part 160 outputs the read manuscript data to image processing part 170.

Image processing part 170, when the manuscript data that manuscript reading part 160 read are input, operates as a circuit that converts it into the image data that can be processed in image forming apparatus 100.

Short-distance-radio communication part 180 is a circuit that performs a direct communication in a short distance with portable terminal 200 by short-distance-radio communication.

Network communication part 190 is a circuit that has a removable LAN interface and connects to network 400.

Then, the function configuration of portable terminal 200 is explained. Portable terminal 200 as shown in FIG. 2 includes control part 210, memory part 220, operation panel 230, operation panel processing part 240, short-distance-radio communication part 250, and network communication part 260. Each part of these has a configuration connected by bus or the like. Control part 210 includes preview image display request processing part 210a and preview image confirmation processing part 210b. Memory part 220 includes preview image data storage area 220a.

Control part 210 is a circuit that has controller, such as a non-transitory recording medium and CPU (Central Processing Unit). Also, control part 210 performs overall control of portable terminal 200. Preview image display request processing part 210a is a circuit that transmits the preview image data request notice to image forming apparatus 100. Preview image display request processing part 210a, when preview image data is received from image forming apparatus 100, memorizes preview image data in preview image data storage area 220a. Preview image confirmation processing part 210b is a circuit that extracts the preview image data from preview image data storage area 220a and shows the image of the preview image data on operation panel 230. The details of the preview image confirmation processing that preview image confirmation processing part 210b performs are described later.

Memory part 220 is a non-transitory recording medium such as a solid state drive and memorizes a program and data of a process that control part 210 performs. Preview image data storage area 220a memorizes the preview image data received from image forming apparatus 100.

Operation panel 230 is a liquid crystal panel that shows an operation screen and the image of the preview image data and performs operation receiving by a user.

Operation panel processing part 240 is a circuit that performs a process that shows the operation item for the function that portable terminal 200 has on operation panel 230. Also, operation panel processing part 240 performs a process that shows an image of preview image data on operation panel 230. Also, operation panel processing part 240 performs a process that inputs a user operation from operation panel 230.

Short-distance-radio communication part 250 is a circuit that performs direct communication with image forming apparatus 100 in short distance by using short-distance-radio communication.

Network communication part 260 is a circuit that is connected to network 400 via access point 300. Also, network communication part 260 is connected to Internet 600 via access point 700.

Figure 3B:
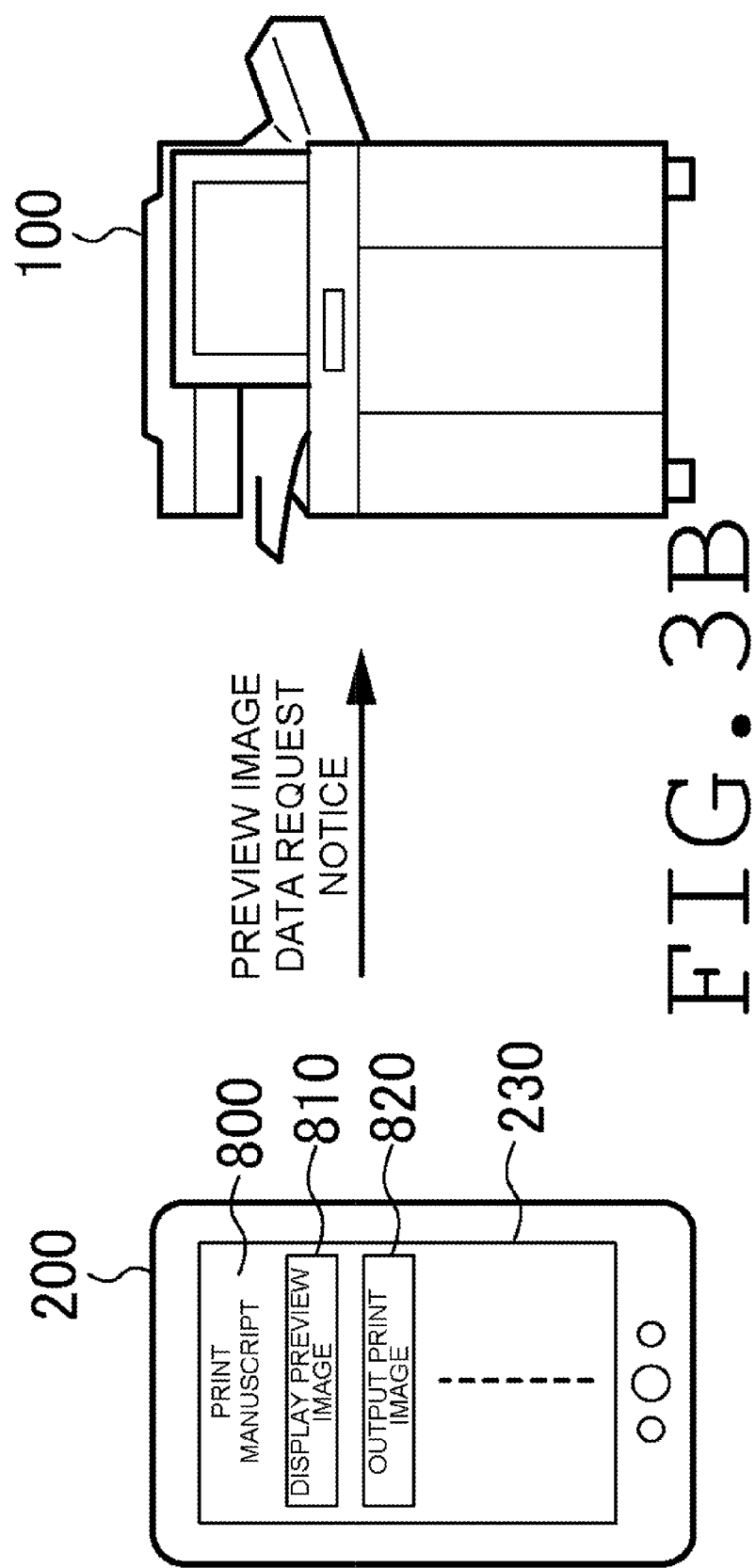
FIG. 3B illustrates the operating procedure that confirms the preview image of the manuscript related to embodiment 1 in the present disclosure.
Figure 3D:
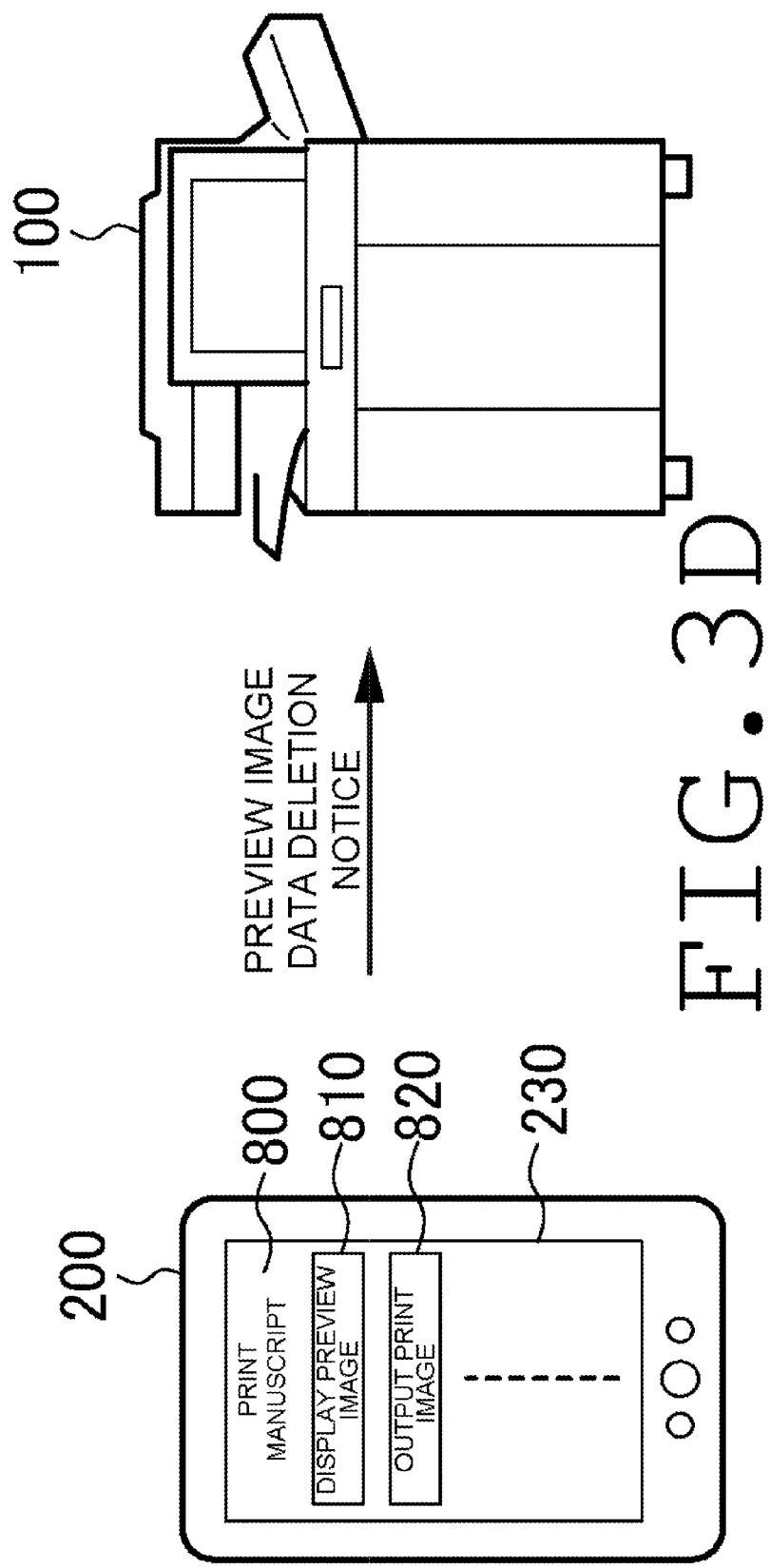
FIG. 3D illustrates the operating procedure that confirms the preview image of the manuscript related to embodiment 1 in the present disclosure.

Then, the operating procedure that confirms the preview image of the manuscript in embodiment 1 is explained as refer to FIG. 3. First, as illustrated in FIG. 3A, a user sets a manuscript to the manuscript stand of image forming apparatus 100. The user operates to be shown manuscript printing screen 800 by using operation panel 230 in portable terminal 200. Then, as illustrated in FIG. 3B, manuscript printing screen 800 is shown on operation panel 230. Next, the user points at "display preview image" button 810 in manuscript printing screen 800. Then, portable terminal 200 transmits a preview image data request notice to image forming apparatus 100. Next, image forming apparatus 100 receives the preview image data request notice. Then, image forming apparatus 100 reads the manuscript set to the manuscript stand. Consequently, as illustrated in FIG. 3C, image forming apparatus 100 transmits preview image data to portable terminal 200. Portable terminal 200 receives the preview image data. Then, portable terminal 200 shows the preview image of the manuscript and "confirm" button 830 on operation panel 230. Next, the user confirms the preview image of the manuscript shown on operation panel 230 and points at "confirm" button 830. Then, as illustrated in FIG. 3D, the manuscript printing screen 800 is re-displayed. In this case, the preview image of the manuscript and "confirm" button 830, which are shown on operation panel 230, are erased. Portable terminal 200 transmits a preview image data deletion notice to image forming apparatus 100. Image forming apparatus 200 deletes the preview image data memorized in preview image data storage area 130b when the preview image data deletion notice is received. Also, portable terminal 200 deletes the preview image data memorized in preview image data storage area 220a. With such the operating procedure, after the user confirms the preview image of the manuscript, the preview image data of the manuscript can be deleted.

Also, as shown in FIG. 3D, after the user confirms the preview image of the manuscript, "output print image" button 820 in manuscript printing screen 800 shown on operation panel 230 may be pointed. In this case, a print image output notice is transmitted from portable terminal 200 to image forming apparatus 100. When image forming apparatus 100 receives the print image output notice, print image generation processing part 110a extracts image data from image data storage area 120a. Image forming apparatus 100 generates print image data from the extracted image data, and memorizes it in print image data storage area 130a. Next, image forming apparatus 100 extracts and prints the print image data from print image data storage area 130a. Then, print image data is deleted in print image data storage area 130a in case that print image data is printed.

Then, the preview image of the manuscript from portable terminal 200 is shown, and after confirming the preview image, the preview image data is deleted. This process is explained in more detail by using the flow chart in FIG. 4.

Figure 4:
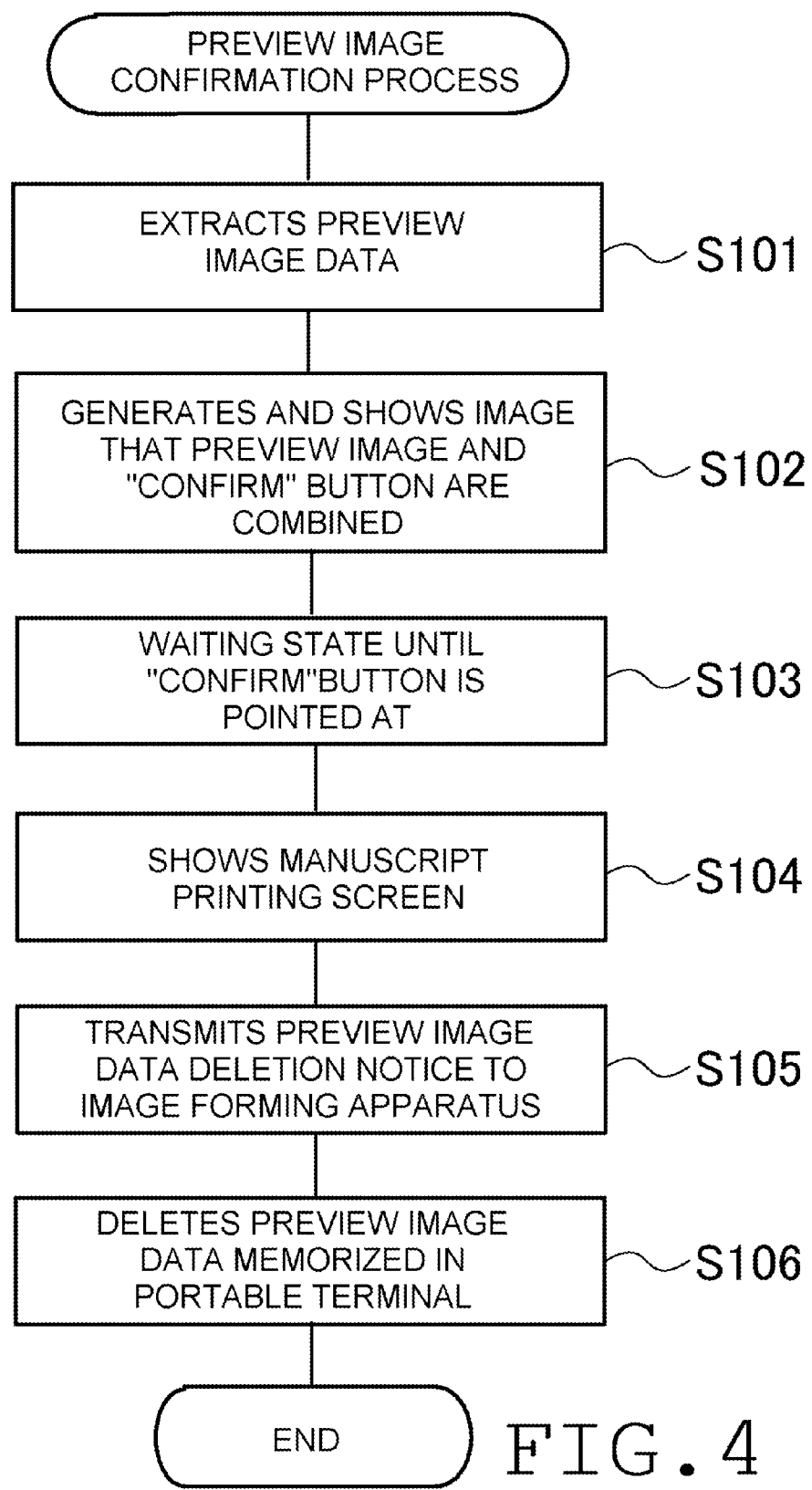
FIG. 4 illustrates steps of the preview image confirmation processing by the portable terminal related to embodiment 1 in the present disclosure.

First, the user sets the manuscript to the manuscript stand of image forming apparatus 100 and performs operation that shows manuscript printing screen 800 from operation panel 230 in portable terminal 200. Then, operation panel processing part 240 shows manuscript printing screen 800 on operation panel 230. Then, the user points at "display preview image" 810 in manuscript printing screen 800. In that case, the notice of a preview image display request is outputted to control part 210 from operation panel processing part 240. Control part 210 starts preview image display request processing part 210*a* when the notice of the preview image display request is input. Then, preview image display request processing part 210*a* transmits a preview image data request notice to image forming apparatus 100. Image forming apparatus 100 receives the preview image data request notice. Then, image forming apparatus 100 transmits the preview image data of the manuscript, which manuscript reading part 160 reads, to portable terminal 200. When the preview image data is received, preview image display request processing part 210*a* memorizes it in preview image data storage area 220*a*. Then, control part 210 detects that preview image display request processing part 210*a* ends the preview image display request processing. In that case, control part 210 starts preview image confirmation processing part 210*b*. Then, preview image confirmation processing part 210*b* starts preview image confirmation processing. Hereinafter, it explains in order of the step in the steps of the preview image confirmation processing as shown in FIG. 4.

First, at step S101, preview image confirmation processing part 210*b* extracts preview image data from preview image data storage area 220*a*.

Next, at step S102, preview image confirmation processing part 210*b* generates an image that combines the preview image of the preview image data and "confirm" button 830. Preview image confirmation processing part 210*b* shows the generated image on operation panel 230 by operation panel processing part 240.

Next, at step S103, preview image confirmation processing part 210*b* is in awaiting state until it is notified that "confirm" button 830 was pointed at from operation panel processing part 240. When preview image confirmation processing part 210*b* is notified that "confirm" button 830 is pointed, it advances a process to Step S104.

Next, at step S104, preview image confirmation processing part 210*b* deletes the image that combined the preview image and "confirm" button 830, which is currently shown on operation panel 230. Preview image confirmation processing part 210*b* shows manuscript printing screen 800 once more.

Next, at step S105, preview image confirmation processing part 210*b* transmits a preview image data deletion notice to image forming apparatus 100 via network communication part 260.

Next, at step S106, preview image confirmation processing part 210*b* deletes the preview image data memorized in preview image data storage area 220*a* and ends preview image confirmation processing.

By above embodiment 1, after the user confirms the preview image, when a preview image data deletion notice is received, image forming apparatus 100 deletes preview image data. The preview image data deleted is memorized in preview image data storage area 130*b* by preview image data deletion processing part 110*d*. Therefore, the preview image data can be deleted regardless of the existence of printing execution instruction. Also, portable terminal 200 shows the preview image on operation panel 230, shortly after receiving the preview image data from image forming apparatus 100. Thereby, the user can carry out confirmation of the preview image immediately without forgetting. Therefore, reduction of the availability of memory or disk capacity by keeping the preview image data of the manuscript memorized in image forming apparatus 100 can be prevented. Also, disclosure of the preview image data of the manuscript serving as secret treatment can be prevented.

That is, in a typical apparatus, when a definite period of time passed in a state that has no printing execution instruction from an external apparatus, image data and printing preview data related to a print preview request are deleted. However, when there is a printing execution instruction, the image data or the printing preview data related to the print preview request are not deleted. Therefore, the printing preview data are kept memorized in the printer, the memory of the printer and the availability of the disk is decreased. Since it remained without deleting the printing preview data of the manuscript serving as secret treatment, it is solicitous about leakage of secrets. Also, in the manuscript with a lot of number of pages, the capacity of preview data is large. Therefore, an image forming apparatus, which allowable memory capacity is limited, cannot have the preview function. As compared with this, by the image forming system, a portable terminal, and an image formation method in the present embodiment, after confirming a preview image, preview image data can be deleted. Also, the preview function that can be suppressed consumption of memory can be provided.

In addition, in embodiment 1, the case where the preview image data request notice and the print image output notice are transmitted from one set of portable terminal 200 to image forming apparatus 100 is explained. However, it is not limited within this case. Even in cases where a preview image data request notice and a print image output notice are transmitted from a plurality of portable terminals 200 to image forming apparatus 100, it can be carried out, similarly.

For example, first, user A sets a manuscript to a manuscript stand, inputs user ID from portable terminal 200, and has a preview image display request. Then, the preview image data request notice in which user ID of user A is stored is transmitted to image forming apparatus 100. Image forming apparatus 100 will read all the pages of the manuscript set to the manuscript stand, when the preview image data request notice is received. Then, image forming apparatus 100 memorizes the read image data of the manuscript in the area for user A in image data storage area 120*a*. Image forming apparatus 100 transmits to portable terminal 200 for user A, when the preview image data of the manuscript is generated. Then, user B sets a manuscript to a manuscript stand, inputs user ID from portable terminal 200, and has a preview image display request. Then, the preview image data request notice in which user ID of user B is stored is transmitted to image forming apparatus 100. Image forming apparatus 100 read all the pages of the manuscript set to the manuscript stand, when the preview image data request notice is received. Then, image forming apparatus 100 memorizes the read image data of the manuscript in the area for user B in image data storage area 120*a*. Image forming apparatus 100 will transmit to portable terminal 200 for user B, when the preview image data of the manuscript is generated. Next, user A inputs user ID from portable terminal 200 and has a print image output request. Then, a print image output notice in which user ID of user A is stored is transmitted to image forming apparatus 100. Image forming apparatus 100 receives the print image output notice. Image forming apparatus 100 extracts image data from the area for user A in image data storage area 120*a*. Image forming apparatus 100 prints print image data, when the print image data is generated from image data. Then, user B inputs user ID from portable terminal 200 and has a print image output request. Then, the print image output notice in which user ID of user B is stored is transmitted to image forming apparatus 100. Image forming apparatus 100 extracts image data from the area of user B of image data storage area 120a, when a print image output notice is received. Image forming apparatus 100 generates print image data from image data. Image forming apparatus 100 prints the print image data. For print image output request, user B may be earlier than user A.

In this way, the user area for user A and user B are provided in image data storage area 120a in image forming apparatus 100. Also, it enables to identify a user demanding the preview image data request notice and the print image output notice by user ID or the like. As configured like this, it can be supported even in cases where the preview image data request notice and the print image output notice are transmitted from a plurality of portable terminals 200 to image forming apparatus 100. That is, the preview image data is deleted after confirming of the preview image, and after printing the print image data, the print image data can be erased.

Next, a second embodiment for carrying out the present disclosure (henceforth "embodiment 2") is described with reference to drawings. According to embodiment 2, it is generated only preview image data of a page read first (henceforth "the first page") for a manuscript that a user set to the manuscript stand of the image forming apparatus by operation of the portable terminal. The generated preview image data is memorized in the image forming apparatus. Also, the image forming apparatus transmits the preview image data of the first page for the manuscript to the portable terminal. Then, the portable terminal memorizes the preview image data and shows it on the operation panel. The user confirms the shown preview image. Then, the preview image data memorized in the portable terminal and the image forming apparatus are deleted.

The functional configuration of the image forming system in embodiment 2 is similar to that of image forming system 10 in embodiment 1 as shown in FIG. 1. Also, the functional configurations of the image forming apparatus and the portable terminal in embodiment 2 are similar to the functional configurations of the image forming apparatus 100 and the portable terminal 200 in embodiment 1 as shown in FIG. 2. Henceforth, they explain by using FIG. 1 and FIG. 2.

Figure 5D:
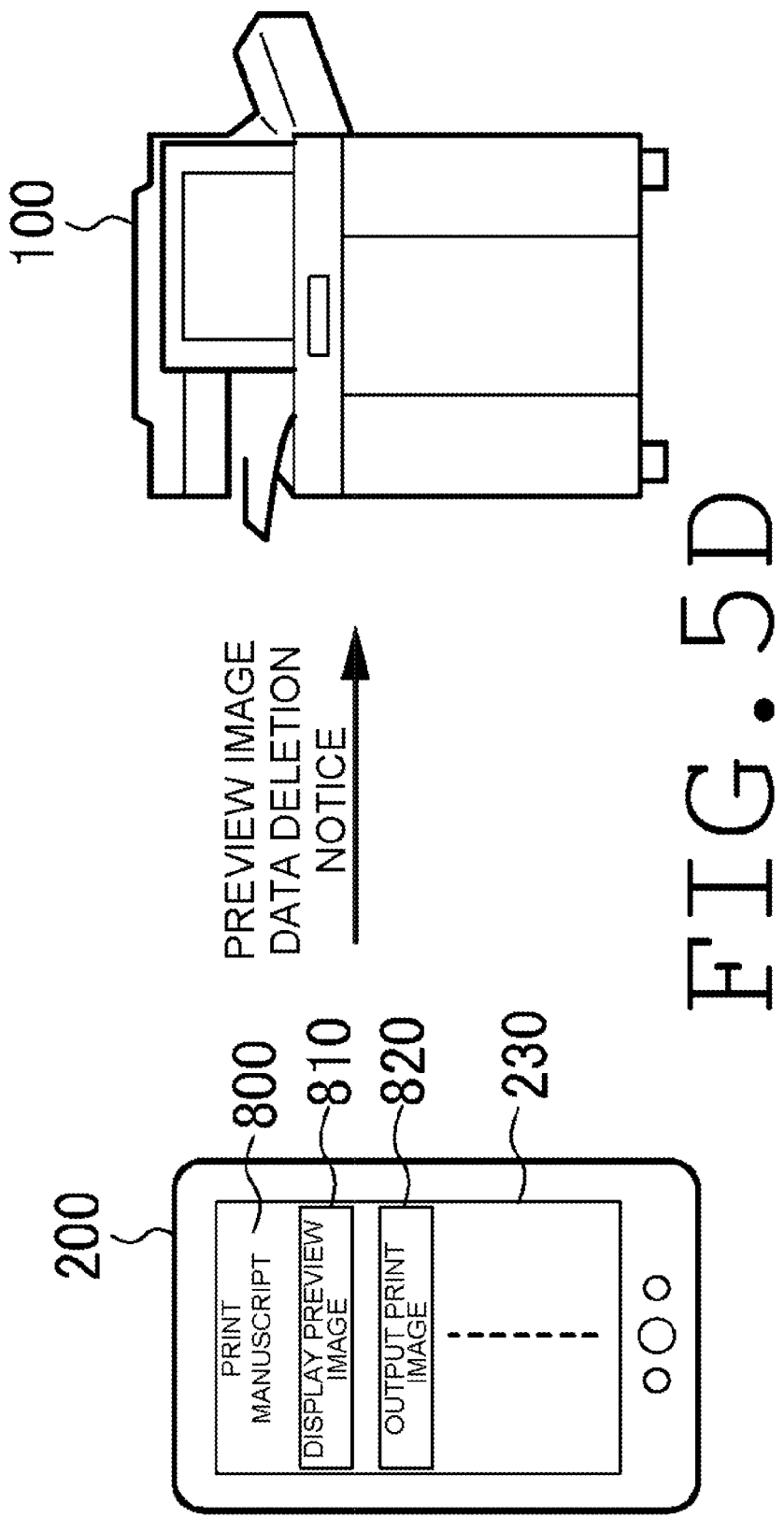
FIG. 5D illustrates the operating procedure that confirms the preview image of the manuscript related to embodiment 2 in the present disclosure.
Figure 5E:
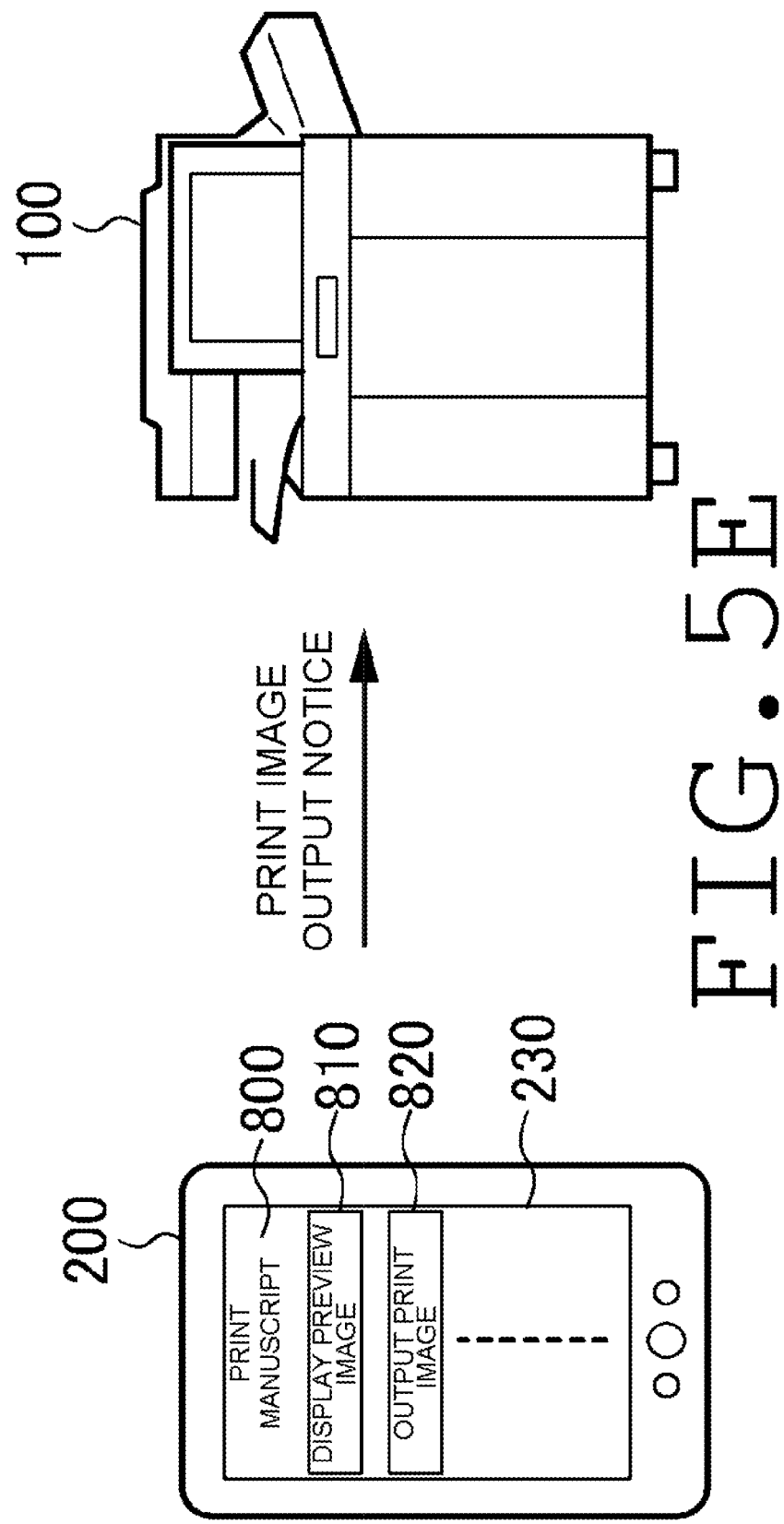
FIG. 5E illustrates the operating procedure that confirms the preview image of the manuscript related to embodiment 2 in the present disclosure.

Then, an operating procedure that confirms a preview image of a manuscript in embodiment 2 is explained with referring to FIG. 5. First, as illustrated in FIG. 5A, a user sets a manuscript to the manuscript stand of the image forming apparatus 100. When the user performs operation that shows manuscript printing screen 800 from operation panel 230 in portable terminal 200, as shown in FIG. 5B, manuscript printing screen 800 is shown on operation panel 230. Next, the user points at "display preview image" button 810 in manuscript printing screen 800. Then, portable terminal 200 transmits a preview image data request notice to image forming apparatus 100. Next, when image forming apparatus 100 receives the preview image data request notice, image forming apparatus 100 read only the first page of the manuscript set to the manuscript stand. Image forming apparatus 100 transmits the preview image data generated from the first page of the manuscript to portable terminal 200, as shown in FIG. 5C. When portable terminal 200 receives the preview image data, portable terminal 200 shows the first page of the preview image of the manuscript and "confirm" button 830 to operation panel 230. Next, the user confirms the first page of the preview image of the manuscript shown on operation panel 230 and points at "confirm" button 830. Then, as shown in FIG. 5D, the first page of the preview image of the manuscript and "confirm" button 830 shown on operation panel 230 are deleted. Then, the manuscript printing screen 800 is re-displayed. Portable terminal 200 transmits a preview image data deletion notice to image forming apparatus 100. Image forming apparatus 200 deletes the preview image data memorized in preview image data storage area 130b when the preview image data deletion notice is received. Also, portable terminal 200 deletes the preview image data memorized in preview image data storage area 220a. Next, the user points at "output print image" button 820 in manuscript printing screen 800. Then, as shown in FIG. 5E, portable terminal 200 transmits a print image output notice to image forming apparatus 100. Image forming apparatus 100 reads the page of the remaining manuscripts set to the manuscript stand by manuscript reading part 160 when the print image output notice is received. Image forming apparatus 100 generates image data from the copy data read by image processing part 170. Image forming apparatuses 100 adds and memorizes these to the image data of the first page memorized in image data storage area 120a. Next, image forming apparatus 100 extracts the image data of all the pages from image data storage area 120a by print image generation processing part 110a. Image forming apparatus 100 generates the print image data of all the pages from the extracted image data. Image forming apparatus 100 memorizes these in print image data storage area 130a. Next, image forming apparatus 100 extracts and prints the print image data of all the pages from print image data storage area 130a. In this way, the print image data of all the pages is deleted in print image data storage area 130a in case that print image data is printed. Also, in a manuscript with a lot of pages, only the preview image of the first page of the manuscript can be generated.

By above embodiment 2, only the first page of the manuscript set to the manuscript stand in image forming apparatus 100 is read, and the preview image data is generated from the read image data. Therefore, reduction of availability of a memory or a disk in image forming apparatus 100 can be prevented. Thereby, consumption of a memory and a disk is restricted. Therefore, also in image forming apparatus 100 that is not able to have a preview function, consumption of a memory and a disk is suppressed, and a preview function can be realized. Also, image forming apparatus 100 transmits only a first page of a preview image data of a manuscript to portable terminal 200. Also, portable terminal 200 memorizes only the first page of the preview image data of the manuscript. Therefore, reduction of the availability of the memory of portable terminal 200 can also be prevented.

In embodiment 2, it is explained that a case where the preview image data request notice and the print image output notice are transmitted from one set of portable terminal 200 to image forming apparatus 100. However, it is not limited to this configuration. It can be carried out similarly even in cases where the preview image data request notice and the print image output notice are transmitted from a plurality of portable terminals 200 to image forming apparatus 100.

For example, first, user A sets a manuscript to a manuscript stand, inputs user ID from portable terminal 200, and has a preview image display request. Then, the preview image data request notice in which user ID of user A is stored is transmitted to image forming apparatus 100. Image forming apparatus 100 will read the first page manuscript set to the manuscript stand when a preview image data request notice is received. Image forming apparatus 100 memorizes the image data of the read manuscript in the area of user A in image data storage area 120a. Image forming apparatus 100 will transmit to portable terminal 200 of user A when the preview image data of a manuscript is generated. Then, user B remove the manuscript of user A from the manuscript stand and sets his/her manuscript to the manuscript stand. Then, user B inputs user ID from portable terminal 200 and has a preview image display request. Then, the preview image data request notice in which user ID of user B is stored is transmitted to image forming apparatus 100. Image forming apparatus 100 reads the first page manuscript set to the manuscript stand when a preview image data request notice is received. Image forming apparatus 100 memorizes the image data of the read manuscript in the area of user B in image data storage area 120a. Image forming apparatus 100 transmits to portable terminal 200 of user B when the preview image data of the manuscript is generated. Then, user A removes the manuscript of user B from the manuscript stand and sets his/her own remaining manuscripts (manuscripts other than the first page) to the manuscript stand. Then, user A inputs user ID from portable terminal 200 and has a print image output request. Then, the print image output notice in which user ID of user A is stored is transmitted to image forming apparatus 100. Image forming apparatus 100 reads the remaining manuscripts of user A when the print image output notice is received. Image forming apparatus 100 memorizes the read image data of the remaining manuscripts in the area of user A in image data storage area 120a. When image forming apparatus 100 extracts the image data from the area of user A in image data storage area 120a, print image data is generated from image data, and it prints the print image data. Then, user B sets his/her own remaining manuscripts (manuscripts other than the first page) to the manuscript stand. User B inputs user ID from portable terminal 200 and has a print image output request. Then, the print image output notice in which user ID of user B is stored is transmitted to image forming apparatus 100. Image forming apparatus 100 reads remaining manuscripts of user B when the print image output notice is received. Image forming apparatus 100 memorizes the image data of the read remaining manuscripts in the area of user B in image data storage area 120a. Image forming apparatus 100 extracts the image data from the area of user B in image data storage area 120a. Image forming apparatus 100 prints print image data when the print image data is generated from the image data. For print image output request, user B may be earlier than user A. In this case, user B continues the preview image display request and the print image output request, and user A has a print image output request after that.

Or, for example, user A sets the manuscript to the manuscript stand first, inputs user ID from portable terminal 200, and has the preview image display request. Then, the preview image data request notice in which user ID of user A is stored is transmitted to image forming apparatus 100. When image forming apparatus 100 receives the preview image data request notice, reads the manuscript of all the pages set to the manuscript stand, and memorizes the image data of the read manuscript in the area of user A in image data storage area 120a. Image forming apparatus 100 generates preview image data of the first page of the manuscript and transmits to portable terminal 200 of user A. Then, user B sets a manuscript to a manuscript stand, inputs user ID from portable terminal 200, and has a preview image display request. Then, the preview image data request notice in which user ID of user B is stored is transmitted to image forming apparatus 100. Image forming apparatus 100 read the manuscript of all the pages set to the manuscript stand when the preview image data request notice is received. Then, image forming apparatus 100 memorizes the image data of the read manuscript in the area of user A in image data storage area 120a. Image forming apparatus 100 generates the preview image data of the first page of the manuscript and transmits to portable terminal 200 of user B. Then, user A inputs user ID from portable terminal 200 and has a print image output request. Then, the print image output notice in which user ID of user A is stored is transmitted to image forming apparatus 100. Image forming apparatus 100 extracts image data from the area of user A in image data storage area 120a when the print image output notice is received. Image forming apparatus 100 prints print image data when print image data is generated from the image data. Then, user B inputs user ID from portable terminal 200 and has a print image output request. Then, the print image output notice in which user ID of user B is stored is transmitted to image forming apparatus 100. Image forming apparatus 100 extracts image data from the area of user B in image data storage area 120a when the print image output notice is received. Image forming apparatus 100 prints print image data when the print image data is generated from the image data. For print image output request, user B may be earlier than user A.

In this way, image data storage area 120a of image forming apparatus 100 has user area of user A and user B. It enables to identify a user having a preview image data request notice or a print image output notice by user ID or the like. Thereby, even in cases where a preview image data request notice and a print image output notice are transmitted from a plurality of portable terminals 200 to image forming apparatus 100, the preview image data is erased after confirming of the preview image. Also, after printing the print image data, it can be erased the print image data.

In addition, in embodiment 2, only the first page of the manuscript set to the manuscript stand of image forming apparatus 100 is read first. However, it is not limited to this. It is also possible to set up the number of pages of the manuscript read first by capacity of the memory that can use for the preview function. That is, it can be set up, for example, 2 pages that are the first page and the next page of the manuscript set to the manuscript stand, or 3 pages that are a first page, the next page, and its next page.

In addition, in embodiment 1 and embodiment 2, after a user confirms a preview image, the preview image data memorized in image forming apparatus 100 and portable terminal 200 are erased. However, it is not limited to this. For example, there is a case that portable terminal 200 has enough capacity of memory and the preview image data is desired to keep memorizing in portable terminal 200. In this case, it is possible to erase only the preview image data memorized in image forming apparatus 100.

Also, in embodiment 1 and embodiment 2, when image forming apparatus 100 receives the preview image data request notice from portable terminal 200, image forming apparatus 100 reads the manuscript set to the manuscript stand and transmits the preview image data of the manuscript to portable terminal 200. However, it is not limited to this. For example, it is also possible to transmit the preview image data of the image data received from other image forming apparatuses 100 and portable terminals 200 and memorized in image data storage area 120a.

Also, embodiment 1 and embodiment 2, image forming apparatus 100 and portable terminal 200 are connected with network 400, and portable terminal 200 and image forming apparatus 100 transmit and receive data by network 400. However, it is not limited to this. For example, image forming apparatus 100 and portable terminal 200 may be connected by short-distance-radio communication by short-distance-radio communication part 180 in image forming apparatus 100 and short-distance-radio communication part 250 in portable terminal 200. Then, portable terminal 200 and image forming apparatus 100 can transmit and receive data by short-distance-radio communication. Also, portable terminal 200 may be connected with image forming apparatus 100 by Internet 600. In this case, portable terminal 200 and image forming apparatus 100 can transmit and receive data by using a communications protocol for Internet 600.

Also, in embodiment 1 and embodiment 2, image forming apparatus 100 generates preview image data from image data. However, it is not limited to this. For example, portable terminal 200 can be received image data from image forming apparatus 100, generates preview image data from the received image data, and shows the preview image.

Also, in embodiment 1 and embodiment 2, a image that combines a preview image and "confirm" button 830 is generated and is shown on operation panel 230. However, it is not limited to this. For example, it is possible only a preview image is shown on operation panel 230, and "determination" button or the like that portable terminal 200 has is used instead of "confirm" button 830.

Also, in embodiment 1 and embodiment 2, portable terminal 200 receives preview image data from image forming apparatus 100 by wireless communications. However, it is not limited to this. For example, it is also possible that portable terminal 200 is mobile PC (Personal Computer,) the PC is connected to network 400 directly and receives preview image data from image forming apparatus 100.

Such an image forming system and a portable terminal of the present disclosure can delete preview image data after confirming a preview image. Also, the preview function that can suppress consumption of memory can be provided.

As mentioned above, although the detailed embodiment explained the present disclosure, the above-mentioned embodiment is exemplification of the present disclosure, and it cannot be overemphasized that it is not limited to an embodiment.

The image forming system and portable terminal of the present disclosure is applicable to the portable terminal that can show the image of preview image data, and all systems having with such the portable terminal.

What is claimed is:

1. An image forming system having a portable terminal and an image forming apparatus, and
the portable terminal comprising:
   a preview image data request notice transmitting circuit that transmits a preview image data request notice to the image forming apparatus,
   a preview image data receiving circuit that receives preview image data from the image forming apparatus,
   a preview image display circuit that shows an image of the preview image data,
   a preview image confirmation input circuit that inputs to be confirmed the preview image, and
   a preview image data deletion notice transmitting circuit that transmits a preview image data deletion notice to the image forming apparatus;
the image forming apparatus comprising:
   a preview image data request notice receiving circuit that receives the preview image data request notice from the portable terminal,
   a preview image data generating circuit that generates the preview image data from image data,
   a preview image data transmission circuit that transmits the preview image data to the portable terminal,
   a preview image data deletion notice receiving circuit the receives the preview image data deletion notice from the portable terminal, and
   an image forming apparatus preview image data deletion circuit that deletes the preview image data memorized in the image forming apparatus; and
the portable terminal, when inputting to be confirmed the preview image, the preview image data deletion notice is transmitted to the image forming apparatus, and
the image forming apparatus deletes the preview image data;
wherein the portable terminal further comprises a portable terminal preview image data deletion circuit that deletes the preview image data memorized in the portable terminal; and
wherein when the portable terminal inputs to be confirmed the preview image, the portable terminal deletes the preview image data.

2. The image forming system according to claim 1,
the portable terminal further comprising a manuscript printing displaying circuit that shows a manuscript printing screen having items of a preview image display and a print image output;
when an item of the preview image display is pointed at the manuscript printing screen, the preview image data request notice is transmitted to the image forming apparatus; and
when the item of the print image output is pointed, a print image output request notice is transmitted to the image forming apparatus.

3. The image forming system according to claim 1,
the image forming apparatus further comprising:
   a manuscript reading circuit that reads a manuscript, and
   an image processing circuit that generates the image data of the manuscript read by the manuscript reading circuit; and
when receiving the preview image data request notice, the manuscript reading circuit reads a manuscript, and
the image processing circuit generates the image data of the manuscript.

4. The image forming system according to claim 1, wherein the image forming apparatus and the portable terminal is connected by a network.

5. The image forming system according to claim 1, wherein the image forming apparatus and the portable terminal is connected by short-distance-radio communication.

6. The image forming system according to claim 1, wherein the image forming apparatus and the portable terminal is connected by Internet.

7. An image forming system having a portable terminal and an image forming apparatus, and
the portable terminal comprising:
   a preview image data request notice transmitting circuit that transmits a preview image data request notice to the image forming apparatus,
   a preview image data receiving circuit that receives preview image data from the image forming apparatus,
   a preview image display circuit that shows an image of the preview image data,
   a preview image confirmation input circuit that inputs to be confirmed the preview image, and
   a preview image data deletion notice transmitting circuit that transmits a preview image data deletion notice to the image forming apparatus;
the image forming apparatus comprising:
   a preview image data request notice receiving circuit that receives the preview image data request notice from the portable terminal,
   a preview image data generating circuit that generates the preview image data from image data, a preview image data transmission circuit that transmits the preview image data to the portable terminal, a preview image data deletion notice receiving circuit the receives the preview image data deletion notice from the portable terminal, and an image forming apparatus preview image data deletion circuit that deletes the preview image data memorized in the image forming apparatus; and the portable terminal, when inputting to be confirmed the preview image, the preview image data deletion notice is transmitted to the image forming apparatus, and the image forming apparatus deletes the preview image data; wherein the manuscript reading circuit reads only the manuscript having set-up number of pages sequentially from first page, the image processing circuit generates the image data of read manuscript, and the preview image data generating circuit generates the preview image data from the image data.

8. The image forming system according to claim 7, wherein the image forming apparatus further comprising a print image data generating circuit that generates print image data from the image data; and when read the print image output request notice, the manuscript reading circuit reads the remaining pages of the manuscript, the image processing circuit generates the image data of the manuscript being read, and the print image data generating circuit generates print image data from the image data having all the pages of the manuscript.

9. The image forming system according to claim 8, wherein the image forming apparatus deletes the memorized print image data when the print image data is printed.

10. The image forming system according to claim 7, wherein the number of pages set up is only first sheet of one page.

11. A portable terminal comprising:

a preview image data request notice transmitting circuit that transmits a preview image data request notice to an image forming apparatus;

a preview image data receiving circuit that receives preview image data from the image forming apparatus;

a preview image display circuit that shows an image of the preview image data;

a preview image confirmation input circuit that inputs to be confirmed the preview image;

a preview image data deletion notice transmitting circuit that transmits a preview image data deletion notice to the image forming apparatus; and when inputting to be confirmed the preview image, the preview image data deletion notice is transmitted to the image forming apparatus, wherein the portable terminal further comprises a preview image data deletion circuit that deletes the preview image data being memorized, and wherein when inputting to be confirmed the preview image, the portable terminal deletes the preview image data.

12. The portable terminal according to claim 11, further comprising a manuscript printing displaying circuit that shows a manuscript printing screen having items of a preview image display and a print image output, when an item of the preview image display is pointed at the manuscript printing screen, transmits the preview image data request notice to the image forming apparatus, and when an item of the print image output is pointed, transmits a print image output request notice to the image forming apparatus.

13. An image formation method performed by an image forming system having a portable terminal and an image forming apparatus, comprising the steps of:

in the portable terminal, transmitting a preview image data request notice to the image forming apparatus and receiving preview image data from the image forming apparatus, showing an image of the preview image data, inputting to be confirmed a preview image, and transmitting a preview image data deletion notice to the image forming apparatus;

in the image forming apparatus, receiving the preview image data request notice from the portable terminal, generating the preview image data from image data, transmitting the preview image data to the portable terminal, receiving the preview image data deletion notice from the portable terminal, and deleting the preview image data being memorized in the image forming apparatus, and in the portable terminal, when inputting to be confirmed the preview image, transmitting the preview image data deletion notice to the image forming apparatus, and in the image forming apparatus, deleting the preview image data;

wherein the portable terminal further comprises a portable terminal preview image data deletion circuit that deletes the preview image data memorized in the portable terminal; and wherein when the portable terminal inputs to be confirmed the preview image, the portable terminal deletes the preview image data.

\* \* \* \* \*